(12) United States Patent
White, III et al.

(10) Patent No.: US 11,988,104 B1
(45) Date of Patent: May 21, 2024

(54) REMOVABLE LAYER TO ADJUST MOUNT STRUCTURE OF A TURBINE VANE FOR RE-STAGGER

(71) Applicant: Raytheon Technologies Corporation, Farmington, CT (US)

(72) Inventors: Robert A. White, III, Meriden, CT (US); Raymond Surace, Newington, CT (US); Howard J. Liles, Newington, CT (US); Bryan P. Dube, Chepachet, RI (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/070,978

(22) Filed: Nov. 29, 2022

(51) Int. Cl.
*F01D 25/00* (2006.01)
*F01D 9/04* (2006.01)

(52) U.S. Cl.
CPC .......... *F01D 25/005* (2013.01); *F01D 9/041* (2013.01); *F05D 2220/323* (2013.01); *F05D 2230/10* (2013.01); *F05D 2240/12* (2013.01); *F05D 2300/6033* (2013.01)

(58) Field of Classification Search
CPC .. F01D 25/005; F01D 9/041; F05D 2220/323; F05D 2230/10; F05D 2240/12; F05D 2300/6033
See application file for complete search history.

(56) References Cited

U.S. PATENT DOCUMENTS

| | | | |
|---|---|---|---|
| 5,439,348 A | 8/1995 | Hughes et al. | |
| 6,418,618 B1 | 7/2002 | Burdgick | |
| 10,024,175 B2 | 7/2018 | Varney | |
| 10,100,656 B2 * | 10/2018 | Bancheri | F16J 15/0887 |
| 10,113,435 B2 | 10/2018 | Pater | |
| 10,401,028 B2 | 9/2019 | Freeman et al. | |
| 10,458,653 B2 | 10/2019 | Freeman et al. | |
| 10,465,534 B2 | 11/2019 | Freeman et al. | |
| 10,472,976 B2 | 11/2019 | Freeman et al. | |
| 10,934,873 B2 | 3/2021 | Sarawate et al. | |

(Continued)

FOREIGN PATENT DOCUMENTS

EP 3198049 B1 12/2018

OTHER PUBLICATIONS

European Search Report for EP Application No. 23213138.3 dated Apr. 8, 2024.

*Primary Examiner* — Jacob M Amick
*Assistant Examiner* — Charles J Brauch
(74) *Attorney, Agent, or Firm* — Carlson, Gaskey & Olds, P.C.

(57) ABSTRACT

A plurality of static stator vane are circumferentially spaced in a row axially intermediate the rows of turbine blades. Each stator vane has at least an outer platform with mount structure. Each of the stator vanes are formed of composite materials. The mount structure is provided with sacrificial material. At least a first of the stator vanes is circumferentially adjacent to a second of the stator vanes. An orientation of the first of the stator vanes is re-staggered relative to the second of the stator vanes. The sacrificial material of the first of the stator vanes is machined away such that a final trailing edge of the first of the stator vanes mount structure is now better axially aligned with the trailing edge of the second of the stator vanes mount structure trailing edge.

20 Claims, 5 Drawing Sheets

(56) References Cited

U.S. PATENT DOCUMENTS

| | | |
|---|---|---|
| 11,143,040 B2 | 10/2021 | McCaffrey et al. |
| 11,466,585 B2 | 10/2022 | Arbona et al. |
| 2013/0004320 A1 | 1/2013 | Edmundo et al. |
| 2017/0058686 A1 | 3/2017 | Bancheri et al. |
| 2020/0141276 A1 | 5/2020 | Wolfe et al. |
| 2021/0025282 A1 | 1/2021 | Wong et al. |
| 2022/0169574 A1 | 6/2022 | Shim et al. |
| 2022/0349314 A1 | 11/2022 | White, III et al. |

* cited by examiner

REMOVABLE LAYER TO ADJUST MOUNT STRUCTURE OF A TURBINE VANE FOR RE-STAGGER

BACKGROUND OF THE INVENTION

This application relates to a method and apparatus for utilizing stagger with gas turbine engine static vanes formed of ceramic matrix composites.

Gas turbine engines are known, and typically include a fan delivering air into a bypass duct as propulsion air. The air is also delivered into a compressor and from the compressor into a combustor. The air is mixed with fuel and ignited in the combustor, and products of the combustion pass downstream through turbine rotor stages driving them to rotate. The turbine rotor assembly in turn drives the fan and compressor rotors.

It is known that components in the turbine section of a gas turbine engine see very high temperatures from the products of combustion. As such, various efforts are taken to ensure the components can withstand these temperatures.

One development for forming turbine section components is the use of ceramic matrix composites ("CMCs"). Ceramic matrix composites can withstand very high temperatures. However, they also raise unique manufacturing challenges relative to their metallic counterparts.

It is known that the turbine section typically includes rotating turbine blades axially alternating with rows of static vanes. The static vanes may sometimes be re-staggered, meaning one or more airfoils in a static vane row are adjusted to change the flow area.

Re-stagger may be utilized to adjust for variation in an individual vane due to manufacturing tolerances. In addition, re-stagger is sometimes utilized to achieve a desired turbine stage flow area based upon an upstream flow in the compressor section.

SUMMARY OF THE INVENTION

In a featured embodiment, a turbine section in a gas turbine engine includes a plurality of rotating turbine blades in a row. A plurality of static stator vane is circumferentially spaced in a row axially intermediate the rows of turbine blades. Each the stator vane in the stator vane row have at least an outer platform with mount structure at at least one of a trailing edge and a leading edge and an airfoil. Each of the stator vanes are formed of composite materials. The mount structure is provided with sacrificial material. At least a first of the stator vanes is circumferentially adjacent to a second of the stator vanes. An orientation of the first of the stator vanes is re-staggered relative to the second of the stator vanes, and such that an original formed mount structure of the first stator vane is not axially aligned with the mount structure of the second of the stator vane. The sacrificial material of the first of the stator vanes is machined away such that a final trailing edge of the first of the stator vanes mount structure is now better axially aligned with the trailing edge of the second of the stator vanes mount structure trailing edge.

In another embodiment according to the previous embodiment, the sacrificial material is provided by a machinable coating.

In another embodiment according to any of the previous embodiments, the machinable coating contains at least a layer of silicon and a top layer of mullite.

In another embodiment according to any of the previous embodiments, the mount structure is at least at the trailing edge.

In another embodiment according to any of the previous embodiments, the sacrificial material is provided by additional plies of unidirectional, woven, and/or braided ceramic fiber cloth incorporated into the layup of the composite body.

In another embodiment according to any of the previous embodiments, a machinable coating is positioned on an outer end of the plies of each of the mount structures of the stator vanes.

In another featured embodiment, a gas turbine engine includes a compressor section. The compressor section is positioned to communicate compressed air into a combustor section and a turbine section positioned downstream of the combustor. The turbine section has a plurality of rotating turbine blades in a row. A plurality of static stator vane is circumferentially spaced in a row axially intermediate the rows of turbine blades. Each the stator vane in the stator vane row has at least an outer platform with mount structure at at least one of a trailing edge and a leading edge and an airfoil. Each of the stator vanes are formed of composite materials and each of the stator vanes are formed by the composite materials being generally identical, other than manufacturing tolerances. The mount structure is provided with sacrificial material. At least a first of the stator vanes is circumferentially adjacent to a second of the stator vanes. An orientation of the first of the stator vanes are re-staggered relative to the second of the stator vanes, and such that an original formed mount structure of the first stator vane is not axially aligned with the mount structure of the second of the stator vane. The sacrificial material of the first of the stator vanes is machined away such that a final trailing edge of the first of the stator vanes mount structure is now better axially aligned with the trailing edge of the second of the stator vanes mount structure trailing edge.

In another embodiment according to any of the previous embodiments, the sacrificial material is provided by a machinable coating.

In another embodiment according to any of the previous embodiments, the machinable coating contains at least one of silicon or mullite.

In another embodiment according to any of the previous embodiments, the mount structure is at least at the trailing edge.

In another embodiment according to any of the previous embodiments, the sacrificial material is provided by additional plies of unidirectional, woven, and/or braided ceramic fiber cloth incorporated into the layup of the composite body.

In another embodiment according to any of the previous embodiments, a machinable coating is positioned on an outer end of the plies of each of the mount structures of the stator vanes.

In another featured embodiment, a method of providing a turbine section for a gas turbine engine includes the steps of 1) providing a plurality of stator vanes each formed of composites, and each having an airfoil extending from an outer platform, the outer platforms each having mount structure at at least one of a leading edge and a trailing edge, 2) providing a sacrificial coating on at least one of the leading edge or trailing edge mount structure, 3) determining that one or more of the stator vanes should have its airfoil provided with re-stagger relative to the airfoil of an adjacent one of said stator vanes once mounted in an engine, and 4)

machining away the sacrificial material to achieve an ultimate mount structure which accounts for the re-stagger of the one of the stator vanes.

In another embodiment according to any of the previous embodiments, the sacrificial material is provided by a machinable coating in step 2).

In another embodiment according to any of the previous embodiments, the sacrificial material is provided by plies of unidirectional, woven, and/or braided ceramic fiber cloth incorporated into the layup of the outer platforms.

In another embodiment according to any of the previous embodiments, after the plies have been applied to the mount structure and the component has been densified, machining away the ceramic matrix composite plies in step 4).

In another embodiment according to any of the previous embodiments, a machinable coating is deposited on an outer end of the trailing edge of each of the mount structure trailing edges after the plies have been machined in step 4).

In another embodiment according to any of the previous embodiments, further includes the step of then machining the added machinable coating.

In another embodiment according to any of the previous embodiments, the machinable coating contains at least a layer of silicon and a top layer of mullite.

In another embodiment according to any of the previous embodiments, the mount structure is at least at the trailing edge.

The present disclosure may include any one or more of the individual features disclosed above and/or below alone or in any combination thereof.

These and other features of the present invention can be best understood from the following specification and drawings, the following of which is a brief description.

DETAILED DESCRIPTION

Figure 1:
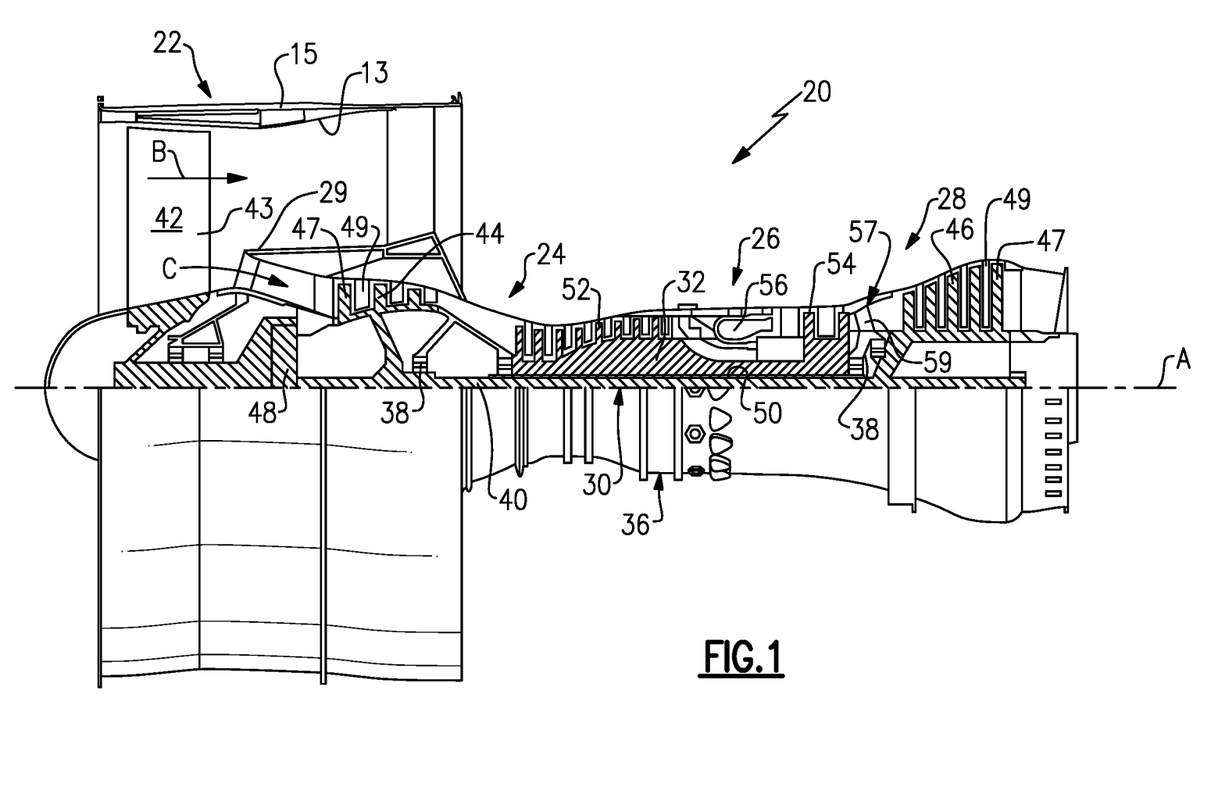
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The fan 42 may have at least 10 fan blades 43 but no more than 20 or 24 fan blades 43. In examples, the fan 42 may have between 12 and 18 fan blades 43, such as 14 fan blades 43. An exemplary fan size measurement is a maximum radius between the tips of the fan blades 43 and the engine central longitudinal axis A. The maximum radius of the fan blades 43 can be at least 40 inches, or more narrowly no more than 75 inches. For example, the maximum radius of the fan blades 43 can be between 45 inches and 60 inches, such as between 50 inches and 55 inches. Another exemplary fan size measurement is a hub radius, which is defined as distance between a hub of the fan 42 at a location of the leading edges of the fan blades 43 and the engine central longitudinal axis A. The fan blades 43 may establish a fan hub-to-tip ratio, which is defined as a ratio of the hub radius divided by the maximum radius of the fan 42. The fan hub-to-tip ratio can be less than or equal to 0.35, or more narrowly greater than or equal to 0.20, such as between 0.25 and 0.30. The combination of fan blade counts and fan hub-to-tip ratios disclosed herein can provide the engine 20 with a relatively compact fan arrangement.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The low pressure compressor 44 and low pressure turbine 46 can include an equal number of stages. For example, the engine 20 can include a three-stage low pressure compressor 44, an eight-stage high pressure compressor 52, a two-stage high pressure turbine 54, and a three-stage low pressure turbine 46 to provide a total of sixteen stages. In other examples, the low pressure compressor 44 includes a different (e.g., greater) number of stages than the low pressure turbine 46. For example, the engine 20 can include a five-stage low pressure compressor 44, a nine-stage high pressure compressor 52, a two-stage high pressure turbine 54, and a four-stage low pressure turbine 46 to provide a total of twenty stages. In other embodiments, the engine 20 includes a four-stage low pressure compressor 44, a nine-stage high pressure compressor 52, a two-stage high pressure turbine 54, and a three-stage low pressure turbine 46 to provide a total of eighteen stages. It should be understood that the engine 20 can incorporate other compressor and turbine stage counts, including any combination of stages disclosed herein.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(Tram\ °\ R)/(518.7°\ R)]^{0.5}$. The corrected fan tip speed can be less than or equal to 1150.0 ft/second (350.5 meters/second), and can be greater than or equal to 1000.0 ft/second (304.8 meters/second).

The fan 42, low pressure compressor 44 and high pressure compressor 52 can provide different amounts of compression of the incoming airflow that is delivered downstream to the turbine section 28 and cooperate to establish an overall pressure ratio (OPR). The OPR is a product of the fan pressure ratio across a root (i.e., 0% span) of the fan blade 43 alone, a pressure ratio across the low pressure compressor 44 and a pressure ratio across the high pressure compressor 52. The pressure ratio of the low pressure compressor 44 is measured as the pressure at the exit of the low pressure compressor 44 divided by the pressure at the inlet of the low pressure compressor 44. In examples, a sum of the pressure ratio of the low pressure compressor 44 and the fan pressure ratio is between 3.0 and 6.0, or more narrowly is between 4.0 and 5.5. The pressure ratio of the high pressure compressor 52 is measured as the pressure at the exit of the high pressure compressor 52 divided by the pressure at the inlet of the high pressure compressor 52. In examples, the pressure ratio of the high pressure compressor 52 is between 9.0 and 12.0, or more narrowly is between 10.0 and 11.5. The OPR can be equal to or greater than 45.0, and can be less than or equal to 70.0, such as between 50.0 and 60.0. The overall and compressor pressure ratios disclosed herein are measured at the cruise condition described above, and can be utilized in two-spool architectures such as the engine 20 as well as three-spool engine architectures.

The engine 20 establishes a turbine entry temperature (TET). The TET is defined as a maximum temperature of combustion products communicated to an inlet of the turbine section 28 at a maximum takeoff (MTO) condition. The inlet is established at the leading edges of the axially forwardmost row of airfoils of the turbine section 28, and MTO is measured at maximum thrust of the engine 20 at static sea-level and 86 degrees Fahrenheit (° F.). The TET may be greater than or equal to 2700.0° F., or more narrowly less than or equal to 3700.0° F., such as between 2750.0° F. and 3350.0° F. The relatively high TET can be utilized in combination with the other techniques disclosed herein to provide a compact turbine arrangement.

The engine 20 establishes an exhaust gas temperature (EGT). The EGT is defined as a maximum temperature of combustion products in the core flow path C communicated to at the trailing edges of the axially aftmost row of airfoils of the turbine section 28 at the MTO condition. The EGT may be less than or equal to 2000.0° F., or more narrowly greater than or equal to 800.0° F., such as between 900.0° F. and 975.0° F. The relatively low EGT can be utilized in combination with the other techniques disclosed herein to reduce fuel consumption.

Figure 2A:
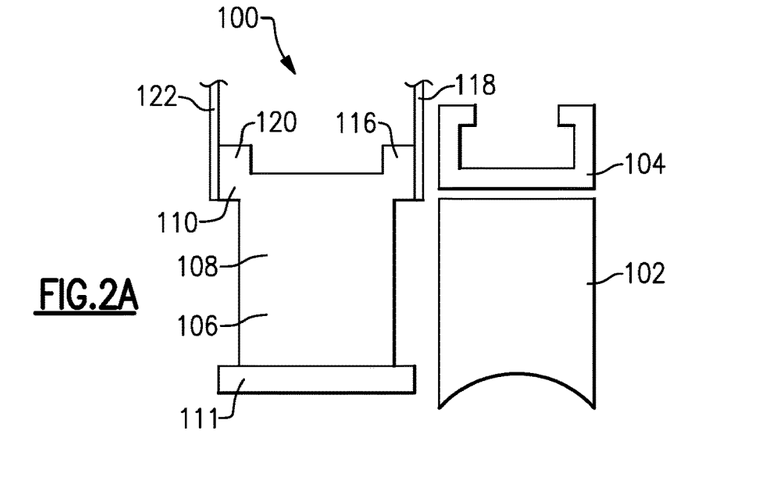
FIG. 2A shows a portion of a turbine section.

FIG. 2A shows a turbine section 100. As known, there are turbine blades 102 rotating in a circumferentially spaced row. A blade outer air seal 104 may be positioned radially outwardly of the blade 102. Static stator vanes 106 are positioned in circumferentially aligned rows axially intermediate rows of turbine blades 102. Each stator vane 106 has an airfoil 108 extending between an outer platform 110 and an inner platform 111. It should be understood that in some cases there need not be an inner platform 111. As shown, on the outer platform 110 there is mount structure 116 and 120. Static mounts 118 and 122 are shown schematically for mounting the vane 106 in the engine.

Figure 2B:
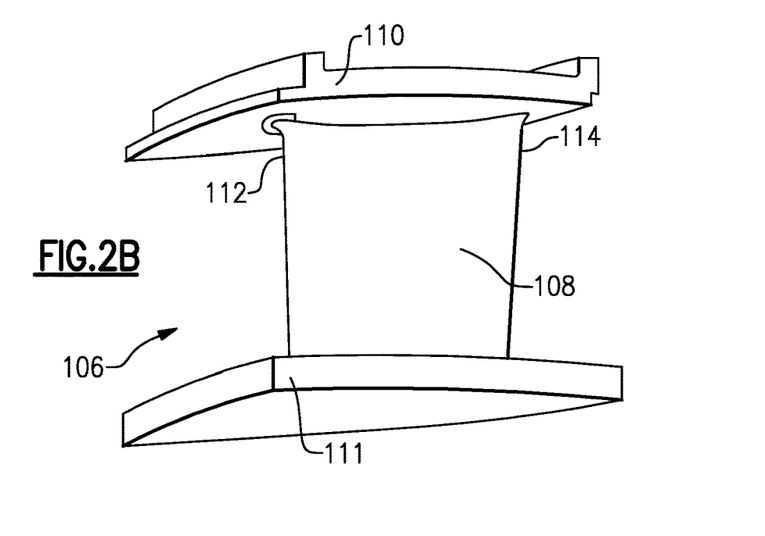
FIG. 2B shows a static vane.

FIG. 2B shows a stator vane 106 and the airfoil 108 having a leading edge 112 and a trailing edge 114.

Figure 2C:
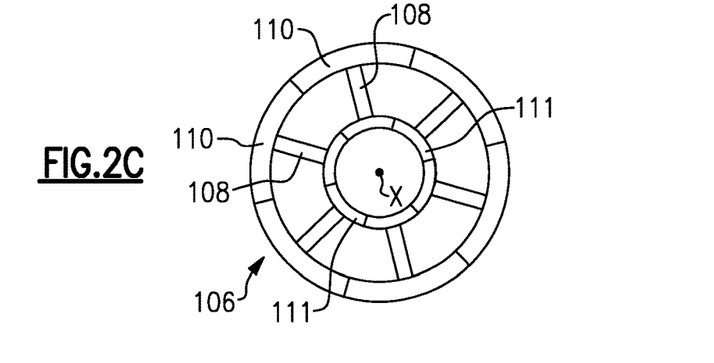
FIG. 2C schematically shows a row of static vanes.

FIG. 2C shows the stator vanes 106 aligned in circumferentially spaced locations. As can be seen, there are typically a plurality of individual stator vanes 106 which together extend for 360 degrees about a rotational axis X of the turbine blades 102.

As mentioned above, it is sometimes desirable to utilize the process of re-stagger on some of the vanes relative to others. In traditional stator vanes formed of a metal this is relatively easy. When one of the stator vanes is rotated to achieve the re-stagger angle the mount surface 116 will also be shifted. It becomes a challenge to mount the entire row as shown in FIG. 2C to the static structure 118, as the mount structure 116 is no longer in the same plane for each of the stator vanes 106. In the prior art related to metallic stator vanes, this goal may be achieved by simply machining away a portion of the metal mount structure 116.

However, stator vanes according to this disclosure are formed of ceramic matrix composites.

Stator vanes according to this disclosure could be formed of any composite material including polymer composites and metal composites, but CMC material and/or a monolithic ceramics are of specific interest and will be the focus of this disclosure. A CMC material is comprised of one or more ceramic fiber plies in a ceramic matrix. Example ceramic matrices are silicon-containing ceramic, such as but not limited to, a silicon carbide (SiC) matrix or a silicon nitride (Si3N4) matrix. Example ceramic reinforcement of the CMC are silicon-containing ceramic fibers, such as but not limited to, silicon carbide (SiC) fiber or silicon nitride (Si3N4) fibers. The CMC may be, but is not limited to, a SiC/SiC ceramic matrix composite in which SiC fiber plies are disposed within a SiC matrix. A fiber ply has a fiber architecture, which refers to an ordered arrangement of the fiber tows relative to one another, such as a 2D woven ply or a 3D structure. A monolithic ceramic does not contain fibers or reinforcement and is formed of a single material. Example monolithic ceramics include silicon-containing ceramics, such as silicon carbide (SiC) or silicon nitride (Si3N4).

Figure 3A:
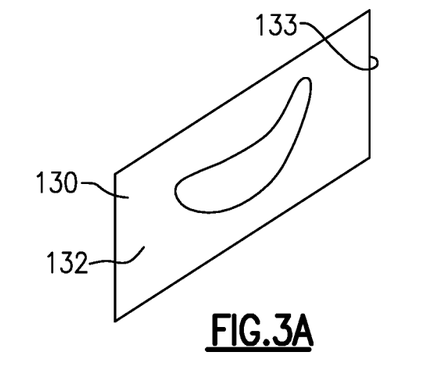
FIG. 3A shows a first step in a method according to this disclosure.

Typically, the stator vanes made of CMCs are formed in a complex manufacturing process. Thus, as shown in FIG. 3A, there is an intermediate stator vane 132 having an outer platform 130 and a trailing edge 133. It would not be desirable to machine away a portion of the edge 133 at the mount structure in the intermediate stator vane 132 as this could comprise the structural integrity of the CMC intermediate stator vane 132.

Figure 3B:
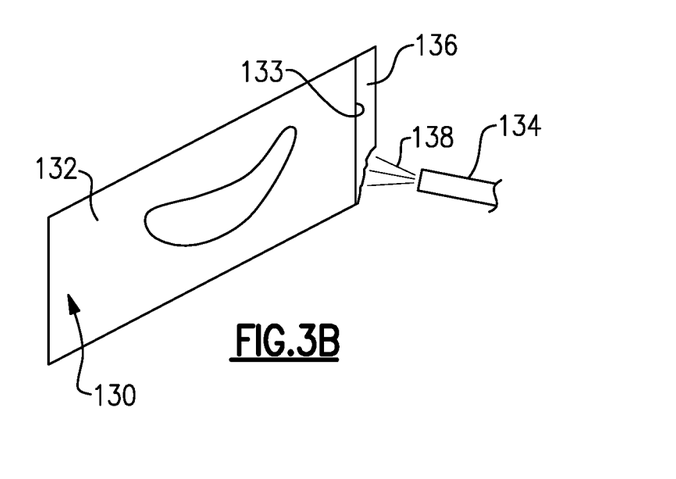
FIG. 3B shows a subsequent step.

Thus, as shown in FIG. 3B a machinable or sacrificial coating 136 is deposited on the trailing edge 133 at the mount structure on the outer platform 130. A coating deposition tool 134 is shown schematically spraying the coating 138 onto the end surface 133.

The coating may include include rare earth silicates, alkaline earth silicates, alkaline earth aluminosilicates, yttria-stabilized zirconia, alumina-stabilized zirconia, mullite, titania, chromia, silicon, silicon oxides, silicon carbides, silicon oxycarbides, barium-magnesium aluminosilicate, hafnium oxides such as hafnon, hafnium silicon oxides, alumina-stabilized zirconia, zirconium oxides such as zircon, yttrium oxides such as yttria, mullite, and combinations thereof. In a particular example, the coating 136 includes at least one of hafnon, zircon, and mullite.

In some examples, the coating can include a layer of mullite deposited as a top coat on a layer of silicon. "Combinations thereof" as mentioned above is not limited to being in a single layer.

Figure 3C:
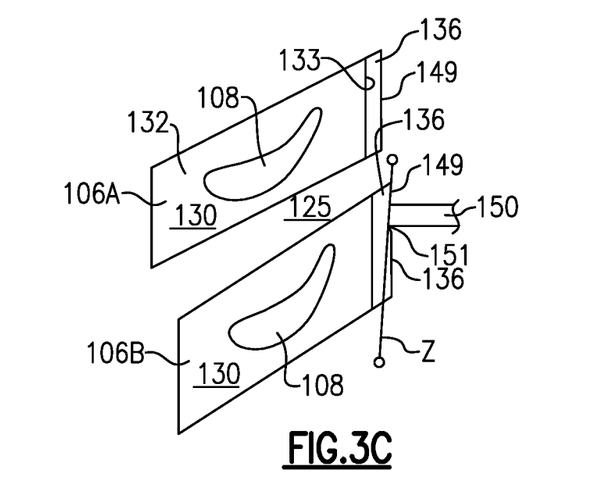
FIG. 3C shows yet another subsequent step.

Next, FIG. 3C shows a subsequent machining step performed along a platform edge of a vane 106B. Vane 106B is shown having its airfoil 108 positioned to be re-staggered relative to the airfoil 108 of an adjacent stator vane 106A.

As can be seen, the airfoil 108 of the stator vane 106B has been generally rotated counterclockwise. The size of the gap 125 between the platforms 130 is exaggerated to show this re-stagger. In practice the pressure and suction side edges of the platforms, as well as the leading edge of the platform, will be machined such that the re-stagger angle is accounted for, and adjacent surfaces are in alignment and gaps are maintained.

Now, machining tool 150 is shown machining away material 136 as shown at 151. This then changes the end surface 149 of the stator vane 106B such that it would be axially aligned with the end 149 of the stator vane 106A, which does not need re-stagger and thus does not need its coating 136 removed at the rotated angle. Line Z shows this alignment.

It should be understood that typically the machining illustrated in FIGS. 3A-3C will be performed before the stator vane 106B is mounted with an engine.

Figures 4A, 4B:
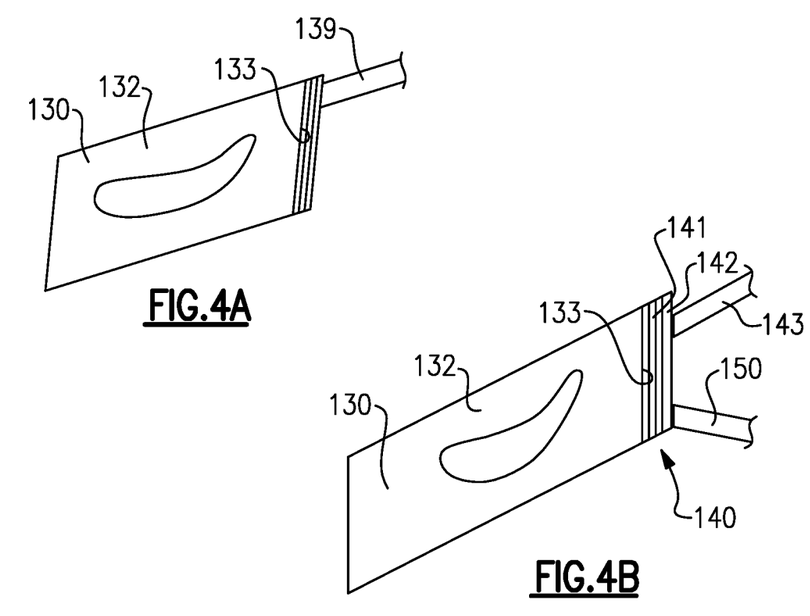
FIG. 4A shows an alternative method embodiment.
FIG. 4B shows a method step subsequent to the FIG. 4A embodiment.

FIG. 4A shows an alternative method which differs only in the sacrificial material applied to the platform trailing edge 133. Here there are sacrificial plies 141 which have been added to the end surface 133. The sacrificial plies may be formed of CMC material. A tool 139 is shown machining away the sacrificial plies 141 to get to the desired end shape of the trailing edge 133. However, when one machines away plies of CMC material it will likely leave a roughened surface.

As such, in a subsequent step a coating 142 is deposited from a coating tool 143 to make the end surface smooth.

As also shown in FIG. 4B, a machining tool 150 then machines away the trailing edge to get to the desired orientation.

Figure 5:
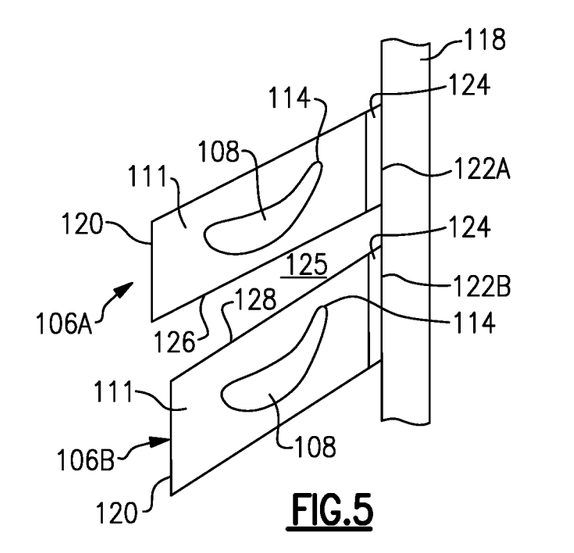
FIG. 5 shows two static vanes which are circumferentially adjacent, and in which re-stagger has occurred.

FIG. 5 shows the final result with stator vanes 106A and 106B having platform trailing edges 122A and 122B which are generally axially aligned. Mount structure 118 can now be attached to the end surfaces 122A and 122B. The machined, added coating remaining is shown at 124. The angle between slides 126 and 128 of vane 106A and 106B, and the relative orientations of their respective airfoils 108 are changed to achieve the re-stagger.

One way to achieve re-stagger would be to form each of the stator vanes individually to have a desired orientation of its airfoil relative to the trailing edge of its mount structure and/or other critical mating and mounting surfaces. However, this would not be practical. In addition, as mentioned above, the re-stagger is utilized to account for variation due to manufacturing tolerances and thus would also not be practical for that reason.

While the above discloses machining the coating for one vane, in practice it may be done for a plurality of vanes in a row, including adjacent vane and even all of the vanes.

Figure 6A:
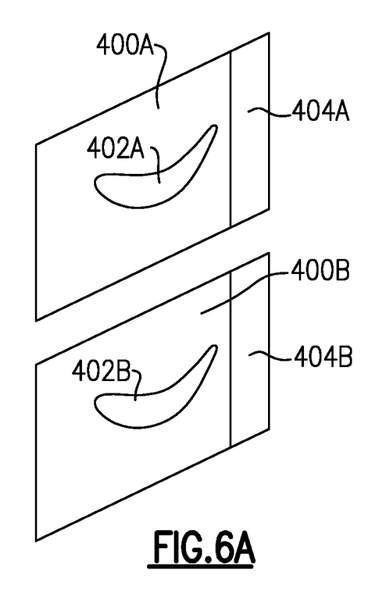
FIG. 6A shows adjacent vanes as manufactured.
Figure 6B:
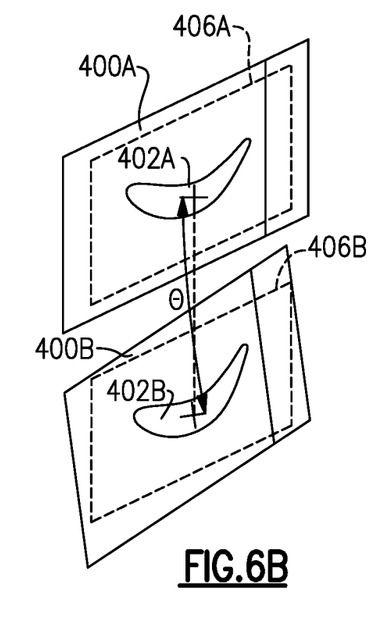
FIG. 6B shows a desired restagger for each of two adjacent vanes.
Figure 6C:
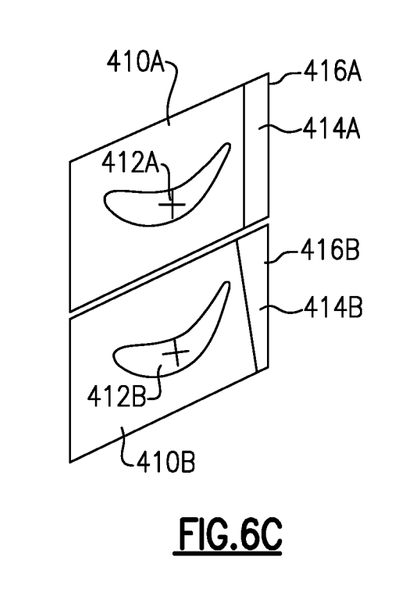
FIG. 6C shows the two vanes after the method of this application has been performed.

The teachings of this disclosure can be summarized by FIG. 6A-6C.

FIG. 6A shows an "as-manufactured" vanes 400A and 400B which are to be circumferentially adjacent. There are airfoils 402A and 402B and sacrificial material 404A and 404B. Vanes 400A and 400B are all generally identical.

FIG. 6B shows a determined re-stagger angle for the as-manufactured vanes 400A and 400B. As can be seen, the airfoils 402A and 402B are determined to desirably be at distinct positions, with the orientations shown generally in outline at 406A and 406B.

FIG. 6C shows the two final vanes 410A and 410B after the machining according to this disclosure such that the airfoils 412A and 412B are in the desired relative orientations and their sacrificial material 414A and 414B have desired edges 416A and 416B.

It could be said that in a turbine section according to this disclosure each of a plurality of stator vanes are formed to be identical other than with regard to manufacturing tolerances, and then they are machined to account for a desired re-stagger. A turbine section in a gas turbine engine under this disclosure could be said to include a plurality of rotating turbine blades in a row. A plurality of static stator vane are circumferentially spaced in a row axially intermediate the rows of turbine blades. Each stator vane in the stator vane row have at least an outer platform with mount structure and an airfoil. Each of the stator vanes are formed of composite materials. A trailing edge of the mount structure is provided with sacrificial material. At least a first of the stator vanes is circumferentially adjacent to a second of the stator vanes. An orientation of the one of the stator vanes is re-staggered relative to the other of the stator vanes, such that an original formed trailing edge of the mount structure of the first stator vane would not be axially aligned with a trailing edge of the mount structure of the second of the stator vane. The sacrificial material of the first of the stator vanes is machined away such that a final trailing edge of the first of the stator vanes mount structure is now better axially aligned with the trailing edge of the second of the stator vanes mount structure trailing edge.

A method of providing a turbine section for a gas turbine engine under this disclosure could be said to include providing a plurality of stator vanes each formed of composites, and each having an airfoil extending from an outer platform. The outer platforms each have mount structure at a trailing edge. A sacrificial coating is provided on a trailing edge of the mount structure. It is determined that one or all of the stator vanes should have its airfoil provided with re-stagger. The sacrificial material is machined away to achieve an ultimate trailing edge of the mount structure which accounts for the re-stagger of the stator vanes.

While the coating is shown at the trailing edge it could also be applied to the leading edge, or both the leading and trailing edge.

Although embodiments of this disclosure have been disclosed, a worker of ordinary skill in this art would recognize that modifications would come within the scope of this disclosure. For that reason, the following claims should be studied to determine the true scope and content of this disclosure.

What is claimed is:

1. A turbine section in a gas turbine engine comprising:
a plurality of rotating turbine blades in a row;
a plurality of static stator vane circumferentially spaced in a row axially intermediate the rows of turbine blades, and each said stator vane in the stator vane row having at least an outer platform with mount structure at at least one of a trailing edge and a leading edge and an airfoil, each of said stator vanes formed of composite materials;
said mount structure being provided with sacrificial material, at least a first of said stator vanes being circumferentially adjacent to a second of said stator vanes, and an orientation of said first of said stator vanes being re-staggered relative to the second of said stator vanes, and such that an original formed mount structure of the first stator vane is not axially aligned with the mount structure of the second of the stator vane, and the sacrificial material of the first of the stator vanes being machined away such that a final trailing edge of the first of the stator vanes mount structure is now better axially aligned with the trailing edge of the second of the stator vanes mount structure trailing edge.

2. The turbine section as set forth in claim 1, wherein said sacrificial material is provided by a machinable coating.

3. The turbine section as set forth in claim 2, wherein the machinable coating contains at least a layer of silicon and a top layer of mullite.

4. The turbine section as set forth in claim 1, wherein the mount structure is at least at the trailing edge.

5. The turbine section as set forth in claim 1, wherein the sacrificial material is provided by additional plies of unidirectional, woven, and/or braided ceramic fiber cloth incorporated into the layup of the composite body.

6. The turbine section as set forth in claim 5, wherein a machinable coating is positioned on an outer end of the plies of each of the mount structures of the stator vanes.

7. A gas turbine engine comprising:
a compressor section, the compressor section positioned to communicate compressed air into a combustor section and a turbine section positioned downstream of the combustor;
the turbine section having a plurality of rotating turbine blades in a row, and a plurality of static stator vane circumferentially spaced in a row axially intermediate the rows of turbine blades, and each said stator vane in the stator vane row having at least an outer platform with mount structure at at least one of a trailing edge and a leading edge and an airfoil, each of said stator vanes formed of composite materials and each of the stator vanes formed by the composite materials being generally identical, other than manufacturing tolerances; and said mount structure being provided with sacrificial material, at least a first of said stator vanes being circumferentially adjacent to a second of said stator vanes, and an orientation of said first of said stator vanes being re-staggered relative to the second of said stator vanes, and such that an original formed mount structure of the first stator vane is not axially aligned with the mount structure of the second of the stator vane, and the sacrificial material of the first of the stator vanes being machined away such that a final trailing edge of the first of the stator vanes mount structure is now better axially aligned with the trailing edge of the second of the stator vanes mount structure trailing edge.

8. The gas turbine engine as set forth in claim 7, wherein said sacrificial material is provided by a machinable coating.

9. The gas turbine engine as set forth in claim 8, wherein the machinable coating contains at least one of silicon or mullite.

10. The gas turbine engine as set forth in claim 7, wherein the mount structure is at least at the trailing edge.

11. The gas turbine engine as set forth in claim 7, wherein the sacrificial material is provided by additional plies of unidirectional, woven, and/or braided ceramic fiber cloth incorporated into the layup of the composite body.

12. The gas turbine engine as set forth in claim 11, wherein a machinable coating is positioned on an outer end of the plies of each of the mount structures of the stator vanes.

13. A method of providing a turbine section for a gas turbine engine comprising the steps of:

1) providing a plurality of stator vanes each formed of composites, and each having an airfoil extending from an outer platform, the outer platforms each having mount structure at at least one of a leading edge and a trailing edge;
2) providing a sacrificial coating on at least one of the leading edge or trailing edge mount structure;
3) determining that one or more of the stator vanes should have its airfoil provided with re-stagger relative to the airfoil of an adjacent one of said stator vanes once mounted in an engine; and
4) machining away the sacrificial material to achieve an ultimate mount structure which accounts for the re-stagger of the one of the stator vanes.

14. The method as set forth in claim 13, wherein said sacrificial material is provided by a machinable coating in step 2).

15. The method as set forth in claim 13, wherein the sacrificial material is provided by plies of unidirectional, woven, and/or braided ceramic fiber cloth incorporated into the layup of the outer platforms.

16. The method as set forth in claim 15, wherein after the plies have been applied to the mount structure and the component has been densified, machining away the ceramic matrix composite plies in step 4).

17. The method as set forth in claim 16, wherein a machinable coating is deposited on an outer end of the trailing edge of each of the mount structure trailing edges after the plies have been machined in step 4).

18. The method as set forth in claim 17, further including the step of then machining the added machinable coating.

19. The method as set forth in claim 13, wherein the machinable coating contains at least a layer of silicon and a top layer of mullite.

20. The method as set forth in claim 13, wherein the mount structure is at least at the trailing edge.

* * * * *